(No Model.)
W. ROBINSON.
MEAT TENDERER.
No. 329,775. Patented Nov. 3, 1885.
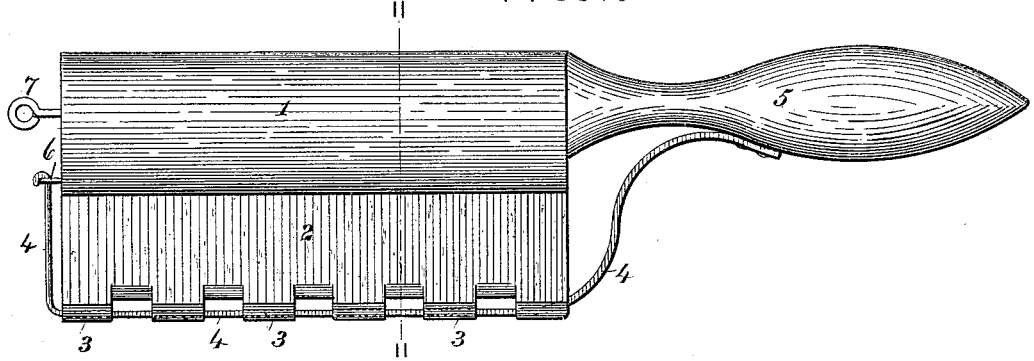
FIG. I.
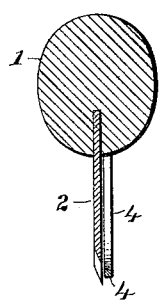
FIG. II.
Attest.
Geo. T. Smallwood.
L. M. Hopkins.
Inventor:
William Robinson.
By Knight Bros.
attys.
N. PETERS, Photo-Lithographer, Washington, D. C.

UNITED STATES PATENT OFFICE.

WILLIAM ROBINSON, OF BELLEFONTAINE, OHIO, ASSIGNOR OF THREE-FOURTHS TO ROBERT C. HUMPHREYS, JAMES L. LOCKHART, AND WILLIAM H. CHANDLER, ALL OF SAME PLACE.

MEAT-TENDERER.

SPECIFICATION forming part of Letters Patent No. 329,775, dated November 3, 1885.

Application filed August 13, 1884. Serial No. 140,389. (No model.)

*To all whom it may concern:*

Be it known that I, WILLIAM ROBINSON, a citizen of the United States, residing at Bellefontaine, in the county of Logan and State of Ohio, have invented certain new and useful Improvements in Meat-Tenderers, of which the following is a specification.

My invention relates to that class of tenderers which are provided with cutting or perforating teeth, and are adapted to operate upon the meat by a pounding action; and in order that it may be fully understood I will proceed to describe it with reference to the accompanying drawings, in which—

Figure I is a side elevation, and Fig. II is a vertical transverse section, of the improved implement.

1 is the back, to which is secured the blade 2, which is formed with a cutting-edge from end to end, and at intervals with projecting teeth 3, as represented in Fig. I. These teeth 3, and also the space between them, are formed with cutting-edges, preferably by beveling or chamfering one side only, as represented in the sectional view, Fig. II.

I am aware that tenderers have heretofore been constructed with blades having teeth at intervals, the spaces between said teeth being redented or formed similarly to the spaces between the teeth of a saw; but such is not the equivalent of my invention. In my device the cutting-edges of the teeth and the cutting-edges of the spaces between said teeth are parallel, or nearly so. It will thus be seen that by this construction the steak will be punctured through and through by the projecting teeth 3, and only partly through by the edges between them, thereby forming a clean cut on the top of the steak the entire length of the blade, while it is held intact by the uncut portions beneath.

In order to prevent the clinging of the meat to the teeth of the implement, I employ a spring, 4, which is secured to the under side of the handle at 5, bent to follow the cutting-edge of the blade 2, and working at its free extremity within an eye or staple, 6, in the end of the back. This spring is rectangular in cross-section, and works close against the straight sides of the teeth, so as to effectually cleanse them after each stroke. It is also provided with a ring, 7, by which it may be hung up.

Having thus described my invention, the following is what I claim as new therein and desire to secure by Letters Patent:

1. In a meat-tenderer, the combination, with a blade having teeth beveled on one side only, of a spring bent to follow the contour of the cutting-edges of said teeth, held against the straight side of said blade or the side opposite the bevels of the teeth, as and for the purpose set forth.

2. The blade 2, having the teeth 3, and also the spaces between said teeth, beveled on one side only, in such a manner that all of the cutting-edges thus formed will fall in the same vertical plane at one side of said blade, as described, in combination with the spring 4, located upon the side of the blade opposite the beveled faces, substantially as and for the purposes set forth.

3. In a meat-tenderer, the combination, with the back 1 and the blade 2, of the spring 4, secured at 5 and working at its free extremity within a staple, 6, as and for the purpose set forth.

WILLIAM ROBINSON.

Witnesses:
E. J. HOWENSTEIN,
J. O. SWEET.